J. J. HAGINS.

Bale-Tie.

No. 8,094. Reissued Feb. 19, 1878.

*WITNESSES:*

C. Clarence Poole

L. H. Seely.

*INVENTOR:*

Jos. J. Hagins by Geo. W. Dyer & Co

Attys

N. PETERS, PHOTO-LITHOGRAPHER, WASHINGTON, D. C.

UNITED STATES PATENT OFFICE.

JOE J. HAGINS, OF ROCK HILL, SOUTH CAROLINA.

IMPROVEMENT IN BALE-TIES.

Specification forming part of Letters Patent No. 151,120, dated May 19, 1874; Reissue No. 8,094, dated February 19, 1878; application filed January 29, 1878.

*To all whom it may concern:*

Be it known that I, J. J. HAGINS, of Rock Hill, in the county of York and State of South Carolina, have invented a new and valuable Improvement in Bale-Ties; and I do hereby declare that the following is a full, clear, and exact description of the construction and operation of the same, reference being had to the annexed drawings, making a part of this specification, and to the letters and figures of reference marked thereon.

Figure 1:
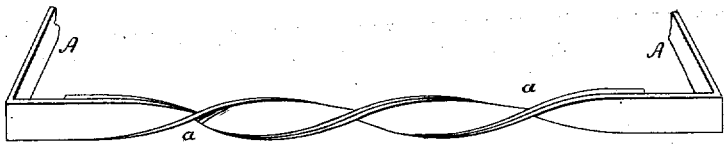
Figure 2:
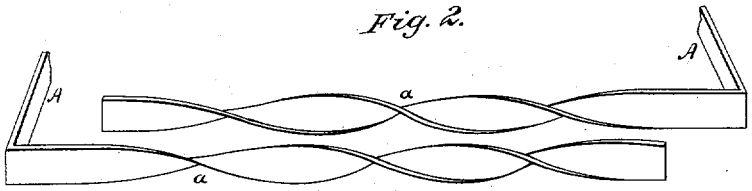

Figure 1 of the drawings is a representation of my improved bale-tie locked. Fig. 2 is a view of the same disconnected.

Before my invention numerous metallic bale-ties had been patented wherein links or clasps of various kinds were used to secure the ends of the bands.

I do not know that any person before myself ever produced a bale-tie which could be made from a single piece of metal, and secured in position upon a bale, so as to be a perfect bale-tie, simply by the friction of the interlocked lapped ends; and, therefore, I declare that the novelty of my invention consists in a metallic bale-tie of such construction that it is held securely in position by the friction of the interlocking lapped ends.

In the drawings, A represents the band, which may be made of hoop-iron. Both ends *a a* of this band are twisted like a common auger, so that the twists of one end fit accurately into the spaces between the corresponding twists of the other end, and thus constitute a simple and effective tie.

The bale having been made up in the usual manner, and surrounded by my improved bands, twisted as above described, the ends are brought together and interlocked by means of clamps or other suitable devices, and the tie or connection thus effected. The bale is then withdrawn from the press, and the expansion of said bale consequent upon the pressure brought to bear upon it while in the press causes the twists or auger-shaped ends to draw tightly or closely together, so that the greater the force of expansion the tighter will be the tie, as will be readily seen from the above description.

To unloosen the ties, a sharp-pointed instrument may be forced between the two twisted ends *a a*, when they will readily separate.

It will be seen from the above description of my improved tie that I do not in any manner weaken the metal forming the band; also, that the bands can be used again and again, and will not be seriously impaired by use.

It will also be seen that when the bale-tie is in position in use it is held in place entirely by the friction of the interlocking parts.

Having described my invention, I claim as new—

A metallic bale-tie which, after having been put around a bale, is locked by twisting its lapped ends together in a continuous twist.

JOE J. HAGINS.

Witnesses:
W. B. WILSON, Jr.,
JNO. P. GAGE.